United States Patent Office 3,266,098
Patented August 16, 1966

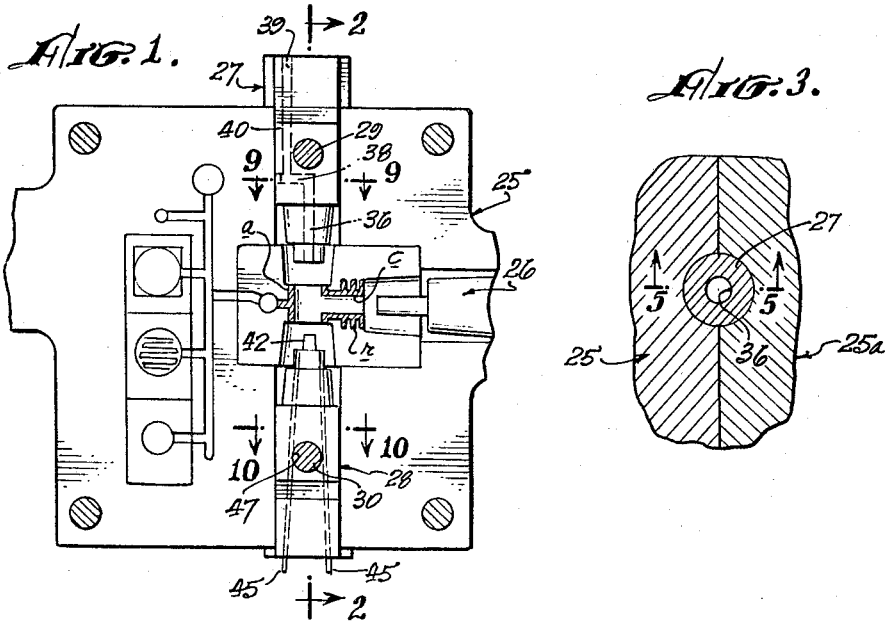
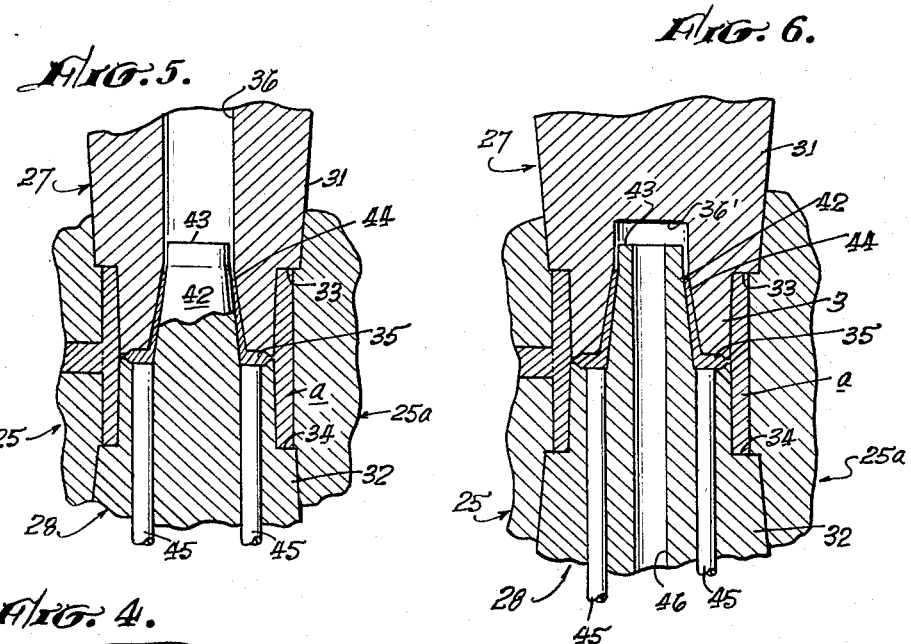
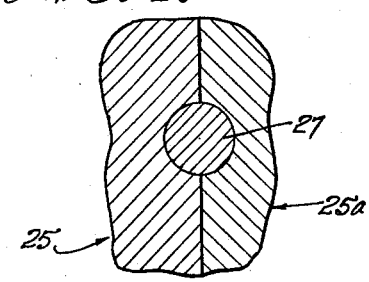

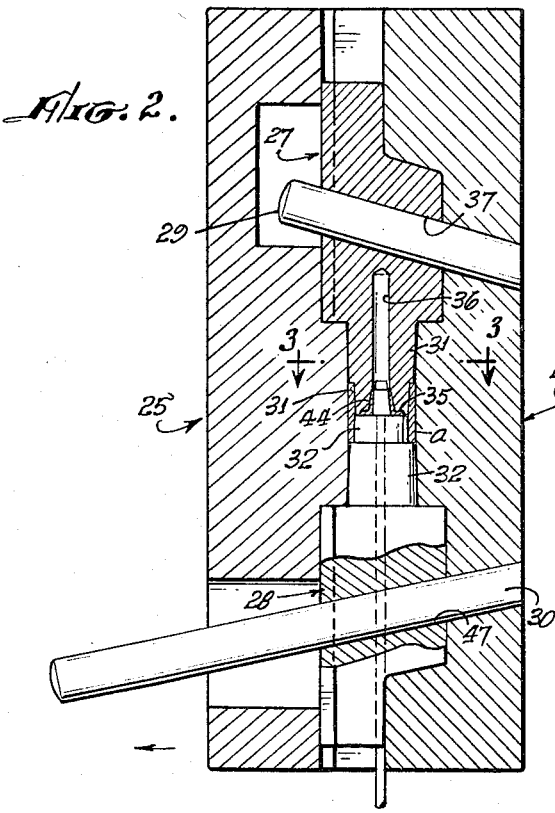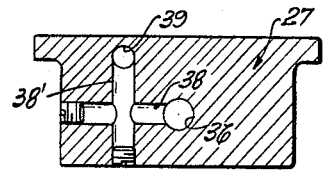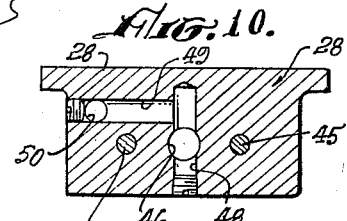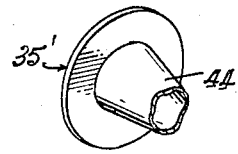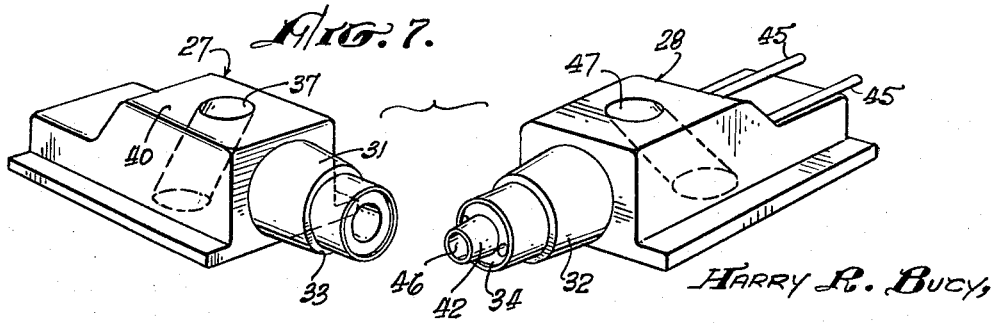

1

3,266,098
BREATHER FOR DIE CASTING AND OTHER MOLDS
Harry R. Bucy, 627 S. Glenwood Place, Burbank, Calif.
Filed Oct. 25, 1963, Ser. No. 318,963
2 Claims. (Cl. 18—42)

This application is a continuation-in-part of my application, Serial No. 814,515, filed March 20, 1959, now Patent No. 3,108,339, granted October 29, 1963, and relates to the art of pressure molding of metal and plastics.

The art of pressure casting and molding of metal and plastics involves the use of a metal mold or die comprising a pair of separable components generally known in the practical art both as the cover half and the ejector half and as the movable die and the stationary die. My said prior application relates, as does the present application to breather or venting means for the cavities in such molds into which the molten material is introduced under pressure and particularly to means for venting such molds for the escape of air and gas therefrom not involving the heretofore common and in fact, only known practice of extending vents for the escape of air and gases across the parting line surfaces of the mold halves from the cavity to a side surface of the mold. This application is also concerned, as is my said prior application, with the problem of ascertaining in advance of a "shot" whether or not the mold is in proper condition to receive the "shot" by means which can also be utilized, if necessary, as an evacuating means to facilitate the entry and distribution of the molten material within the mold cavity as well as in the gates and runners employed to deliver the molten material to the mold cavity proper. To characterize the broadest aspect of the invention concisely as disclosed both in my said prior application and in this application, it is concerned with preserving the integrity of the parting line surfaces of the mold halves insofar as the passage of air or gas or molten material between them is concerned.

The means for thus preserving the integrity of the parting line surfaces of mold halves against the passage of molten material therebetween described and claimed in my said prior application contemplates the employment of cooperating means on both of the mold halves to form the desired breathers which allow gas and air to escape from the mold cavity as the molten material enters the mold cavity and to allow the mold cavity to be at least partially evacuated by jet pump devices. The present invention is concerned with, and has for its principal objective, the provision of breather devices which are similar to those in my said prior application only in that they preserve the said desirable integrity of the parting line surfaces of the mold halves, but differ from the breathers shown in my said prior application in that each breather is located wholly in or on one or the other of the mold halves; a further objective of the present invention being the provision of such breather means in molds for the reception of molten material under pressure together with the formation of such breather devices in a manner that jet pump vacuum producing devices can be applied to such breathers if desired or necessary.

With the foregoing objectives in view, together with such other objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a plan view of the parting face side of a mold half provided with certain core elements slidingly mounted thereon and operable to form one or more openings in the casting, which openings are disposed at an angle to the movement of the movable die component of the mold and said core elements being movable on the die half on which they are supported in directions which are parallel to the plane of the parting line surfaces of the mold, FIG. 2 is an enlarged scale sectional view taken on the line 2—2 of FIG. 1 showing particularly a pair of said core elements which cooperate with each other and disposed in the position occupied thereby when the mold is closed, FIG. 3 is a fragmentary, enlarged scale, transverse sectional view taken on the line 3—3 of FIG. 2, FIG. 4 is a view similar to FIG. 3 but has reference to the modified form of the invention shown particularly in FIG. 6, FIG. 5 is a fragmentary view on a still larger scale taken on the line 5—5 of FIG. 3, FIG. 6 is a view similar to FIG. 5 and taken on the same line as FIG. 5 but showing a modified form of the invention, FIG. 7 is a perspective view of the cooperating core elements, FIG. 8 is a perspective view of a typical casting or slug of excess metal formed by the cooperating cores of the device shown in cooperative relation in FIGS. 1 and 2, FIG. 9 is an enlarged scale, transverse view taken on the line 9—9 of FIG. 1, and FIG. 10 is a similar view taken on the line 10—10 of FIG. 1 having reference particularly to the modified form of the invention more particularly shown in FIG. 6.

The drawings show by way of example, a mold comprising halves 25 and 25a which is arranged for simultaneously casting (as is common practice) a number of different parts simultaneously and particularly the frame of a small gasoline motor such as it is used on model airplanes and motor cars, the said frame involving a hollow cylindrical crankcase $a$ and an integrally formed cylinder $c$ surrounded by cooling ribs $r$. The interior of the cylinder is formed by a movable side core 26 which through means, not shown, is moved into and out of position as the mold is locked up and opened. Also slidably mounted on the die component illustrated for reciprocable movement toward and away from each other are core members 27 and 28 which, for convenience in identification only, will be referred to as the upper and lower core members, respectively, said core members being actuated to approach each other to form a core about which the crankcase $c$ is cast as shown in FIG. 2 as an incident to closing of the mold and to separate from each other to permit removal of the casting as shown in FIG. 1, such movement being achieved in any way feasible and usual in diemaking practice, the illustrated angle pins 29 and 30 on the opposite half of the mold being a common means for operating sliding cores or the like on the die components of molds. Generally, such relatively moving cores are mounted on the movable or cover half of a mold but can be mounted on the ejector half of the mold, if desired.

Having reference first to FIGS. 2, 3, 5 and 9, the core members 27 and 28 are provided with cylindrical core surfaces 31 and 32 and end shoulders 33 and 34 which serve to define the portions of the mold cavity forming the inner surface and ends of the crankcase portion of the casting, the end surfaces being slightly cupped to form a thin edge or gate and a thicker disk-like portion 35 at the center of the crankcase to which further reference will be made. The core member 27 has a bore 36 extending axially of the surface 31 from the inner end thereof upwardly to a point short of the inclined transverse bore 37 engaged by the angle pin 29, said bore 36 being connected by a pair of intersecting transverse bores 38 and 38′ with a bore 39 extending to the upper end of the core member body portion 40 and adapted to communicate with atmosphere or to be connected to a jet pump of the type shown in my said prior patent as the need of the casting may require. The lower end of said axial bore 36 is downwardly and outwardly tapered as at 41 and the core member 28 is provided with a distal end having a slightly less tapered portion 42 entering the tapered portion 41 of the bore 36 and terminating in a distal end 43 entering the lower end of said straight portion of the bore 36 with sufficient clearance only to permit the flow of air and gas in the manner shown in my said prior application, the resulting excess metal entering the said distal end to form a hollow, frusto-conical portion 44 on the disc portion 35 shown in FIG. 8; and combining therewith to form the slug 35′. The operation of this modification of the invention is believed to be obvious. When the mold is closed, if a jet pump means is employed, the breather formed by the two core members may be tested and thereafter, if desired, or needful, the vacuum produced by the jet pump may be employed while the shot is being made. Actually, the only essential difference between this form of my invention and the form shown in my said prior application is that both of the relatively moving, breather forming components are on one die or mold half instead of being one each on each of the two halves. Incident to opening of the mold and retraction of the core members, the lower core member is provided with ejection pins 45 effective to free the slug 35′ from the tapered portion 42 of the core member 28 and any suitable and usual means can, of course, be provided for actuating these ejector pins.

Referring finally to FIGS. 4, 6 and 10, there is shown a final modification of the present invention in that the air and gas passage 36 in the upper core member 27 is eliminated and the lower core member 28 is provided with an axial bore extending from the upper end thereof to an exhaust means to be later described. The bore 36′ in the member 27 terminates a short distance above the distal straight end 43 of the core member 28 the frusto-conical surfaces of the bore 36 and the tapered end 42 of the core member 28 being the same, wherefore, these members cooperate to form the excess metal slug or casting shown in FIG. 8.

The bore 46 extends axially of the surface 32 downwardly along the member 28 to a point short of the hole 47 which is engaged by the angle pin 30 and is connected by intersecting, transverse bores 48 and 49 with a longitudinal bore 50 extending to the lower end of the member 28 which bore may either open direct to atmosphere or be connected to a jet pump means such as shown in my said prior patent. It is believed to be obvious that this modification of my invention may be substituted for the breathers shown in my said prior patent and that the breather bore thus formed is disposed in the mold half which thus creates the breather and that it is, in effect, a substitute or alternative for the breather shown in FIG. 5. Alternatively, while the breather here shown is in the complex form embodying two relatively moving core-forming members, in the light of the foregoing teaching, a die maker or die designer would readily apply a breather involving this invention to a single core-forming member, such as the member 26, moving relatively to a stationary portion of the die half on which such core-forming member was mounted for a particular casting.

While in the foregoing specification there have been disclosed certain presently preferred embodiments of my invention, such disclosure has been by way of example, it being realized that different molds for different parts will, of necessity, require the utilization of various portions of the teachings of this invention within the framework of the broad principle of preserving the integrity of the meeting surfaces of a mold against the passage of the molten material or of expelled or evacuated air or gas therebetween. Accordingly, the invention is not to be deemed to be limited to the specific examples thus disclosed and it will be understood that the invention includes as well all such changes and modifications in the parts and in the construction, combination and arrangement of parts as shall come within the purview of the appended claims.

I claim:

1. In a mold comprising a pair of metal components movable into juxtaposition with each other to define a cavity into which molten material is to be introduced under pressure, in which the juxtaposed surfaces of said components seal the said cavity against the passage between said surfaces of air or gas from the mold cavity to atmosphere incident to said introduction of molten material, the provision on one of said components of a breather passage means associated wholly with said one of said components, said breather passage means including relatively moving elements carried by one only of said components, and in which said mold includes means for moving at least one of said elements into such juxtaposition relative to the other as an incident to moving said components into mold closing juxtaposition, so that the entrance to said breather passage means is so reduced in width by such movement of at least one of said elements that only air and gas may pass therethrough and in which said relatively movable elements include at least one element mounted for movement into and out of cooperative relationship with another element on said one of said mold components as said mold is closed and opened, respectively, with resultant completion of a breather passage means leading from the mold cavity through said movably mounted one of said elements to a surface thereof forming a portion of the exterior surface of said mold.

2. In a mold comprising a pair of metal components movable into juxtaposition with each other to define a cavity into which molten material is to be introduced under pressure, in which the juxtaposed surfaces of said components seal the said cavity against the passage between said surfaces of air or gas from the mold cavity to atmosphere incident to said introduction of molten material, the provision on one of said components of a breather passage means associated wholly with said one of said components, said breather passage means including relatively moving elements carried by one only of said components, and in which said mold includes means for moving at least one of said elements into such juxtaposition relative to the other as an incident to moving said components into mold closing juxtaposition, so that the entrance to said breather passage means is so reduced in width by such movement of at least one of said elements that only air and gas may pass therethrough and in which said relatively movable elements constitute a pair of members slidably mounted for movement on one of said components for movement toward and away from each other as the mold is closed or opened and in which said breather passage means extends through one of said members from said mold cavity to atmosphere.

References Cited by the Examiner

UNITED STATES PATENTS

| | | | |
|---|---|---|---|
| 1,983,976 | 12/1934 | Garvey. | |
| 2,865,052 | 12/1958 | Wilcox | 18—42 X |
| 2,900,664 | 8/1959 | Hampel. | |
| 2,911,678 | 11/1959 | Brunfeldt. | |
| 3,074,113 | 1/1963 | Specht | 18—42 |
| 3,108,339 | 10/1963 | Bucy | 18—42 X |

J. SPENCER OVERHOLSER, *Primary Examiner.*

MICHAEL V. BRINDISI, *Examiner.*

J. H. FLINT, *Assistant Examiner.*